United States Patent Office 3,756,846
Patented Sept. 4, 1973

3,756,846
WEATHERPROOF CAULKED EXTERNAL METAL SURFACES
Klaus Hossenfelder, Westphalia, Germany, assignor to Glasurit-Werke M. Winkelmann AG, Hamburg-Wandsbek, Germany
No Drawing. Continuation-in-part of application Ser. No. 18,346, Mar. 10, 1970. This application Oct. 29, 1971, Ser. No. 194,035
Claims priority, application Austria, Mar. 19, 1969, A 2,705/69
Int. Cl. B32b 15/08
U.S. Cl. 117—75      5 Claims

ABSTRACT OF THE DISCLOSURE

Weatherproof caulked external surfaces of iron and steel having a metal base and coated thereon a synthetic rubber dispersion of copolymers of styrene, butadiene and an unsaturated carboxylic acid made thixotropic by the addition of organic and/or inorganic thickeners, and inorganic and/or organic fibrous substances.

CROSS-REFERENCES TO RELATED APPLICATIONS

The present application is a continuation-in-part of application Ser. No. 18,346, filed Mar. 10, 1970.

Applicant claims priority under 35 U.S.C. 119 for application A 2705/69, filed on Mar. 19, 1969 in the Patent Office of Austria.

BACKGROUND OF THE INVENTION

The field of the invention is weatherproof caulking compositions, and particularly automobile undercoatings.

The state of the prior art may be ascertained by reference to German published application 1,279,264 of Karl-Heinz Mielke et al., German Pat. 915,483 of Frederick J. Wehmer et al., U.S. Pats. 3,192,176 and 3,304,277 of Karl-Heinz Mielke et al., U.S. Pat. 3,230,162 of Gilchrist, and the Kirk-Othmer "Encyclopedia of Chemical Technology," 2nd ed., vol. 1 (1963), pages 224–240 under the section entitled "Acids, Carboxylic," and vol. 19 (1969), pages 85–134 under the section entitled "Styrene Plastics."

U.S. Pat. 3,192,176 discloses a mixture of diene copolymers in acrylonitrile copolymer, while U.S. Pat. 3,304,277 discloses a metal primer of an acrylonitrile copolymer and a trialkyl phosphate additive. The patent of Gilchrist discloses polycarboxylic acid resins having α,β-unsaturated carboxylic acids and butadiene-styrene latices. Gilchrist also discloses the addition of alkyd resins.

Vol. 1 of Kirk-Othmer discloses unsaturated monocarboxylic acids at page 231, Table 4, and unsaturated di- and tri-carboxylic acids in Table 5 at page 232.

Styrene, butadiene and maleic anhydride copolymers are disclosed in Vol. 19 at page 91 of Kirk-Othmer.

Numerous attempts have been made heretofore to employ aqueous plastic dispersions for the normal priming of metals, which is followed by an additional lacquering step. Such products, which are known, for example, from German Published Application 1,279,264 of Karl-Heinz Mielke et al. cannot be employed, however, for the application of thick layers, since they are not thixotropic and thus slide off from vertical surfaces.

Furthermore, organosole and plastisols of polyvinyl chloride resins have also been employed as corrosion-protective coating compositions. Likewise conventional are sealing compounds of an asphaltic base which contain, in addition to rubber solutions, fillers, and fibers, also considerable amounts of organic solvents (German Patent 915,483 of Frederick J. Wehmer et al.). Such coating compositions are completely unsuitable for the purposes of the present invention, since they are not sufficiently stable, and contain considerable amounts of organic solvents. The flammability of the coating compositions is obvious, because of the organic solvents incorporated therein.

SUMMARY OF THE INVENTION

The disadvantages of the prior art are avoided, in accordance with the invention, by employing sprayable, aqueous thixotropic coating compositions. The invention is distinguished in that the coating compositions employed contain a synthetic rubber dispersion of copolymers of styrene, butadiene, and an unsaturated carboxylic acid, as well as organic and/or inorganic thickeners and an inorganic fibrous pigment.

Furthermore, this invention relates to external iron and steel surfaces which are sealed so that they are weather-resistant, particularly those surfaces on the undercarriage of automobiles, characterized in that there is provided on the untreated metallic surface a hardened coating which is firmly bonded to the metal. This coating contains copolymers of styrene, butadiene, and an organic unsaturated carboxylic acid, organic and/or inorganic thickeners, and inorganic and/or organic fibrous substances, in a thickness of between 200 and 2,000 microns. An additional characteristic is that a priming coat is additionally provided between the metal and the coating.

In this connection, it is particularly surprising that the particular results which are explained in detail below, are clearly restricted to the coating composition employed according to the invention. Even different synthetic rubber latices do not yield any comparable success.

The preparation of the copolymer styrene, butadiene and an organic unsaturated carboxylic acid is disclosed in "Ullmanns Encyklopadie der technischen Chemie," 3. Auflage, 9. Band, 1957, Urban & Schwarzenberg Verlag, p. 331 to 335.

Useful proportions, based on the dry weight of the copolymer for the copolymer are 35–85 percent styrene, 10–64 percent butadiene and 1–5 percent unsaturated carboxylic acid. The preferred proportions are 39–60 percent styrene, 40–61 percent butadiene and 2–3 percent unsaturated carboxylic acid.

The unsaturated carboxylic acids have generally 3 to 20 carbon atoms and preferably 3 to 4 carbon atoms. The following are given as specific examples of the unsaturated carboxylic acids: β-eleostearic, α-linolenic, erucic, maleic, fumaric, itaconic, acetylenedicarboxylic aconolic, preferred maleic, fumaric, acrylic and methacrylic acid.

The primer compositions suitable for use with the present invention are:

alkyd-melamine-primer
alkyd-urea-primer
epoxide based primer
phenolic resin primer
combination of maleinized oils with phenolic resins or melamine resins
acrylic resin primer These primers may be thinned in watery solutions or in organic solvents. They may also be electrodeposition paints.

The useful thickener concentration, in percent by weight, is 0 to 1 with the preferred concentration being 0.2 to 0.6.

The weatherproof caulked metal surfaces comprise:
(A) an iron containing base material;
(B) a coating on the base material having a thickness of about 200–2,000 microns and having the following components in percent by weight based on the total weight of coating:

(a) 30 to 50 percent of a copolymer comprising 35–85 percent styrene, 10–64 percent butadiene and 1–5 percent unsaturated carboxylic acid;

(b) 0 to 30 percent of a thickener comprising acrylate-acrylic acid polymers and bentonites;

(c) 0 to 3 percent of a fibrous material such as asbestos, polyamide, polyester and polyacryl nitrile having a maximum fiber length of 3 mm., the asbestos fibers having more than 90 percent by weight with a maximum length of less than 0.5 mm.; and (d) 40 to 60 percent pigments and other fillers.

By thickeners comprising acrylate-acrylic acid polymers are meant copolymers in their neutralized form in aqueous solution consisting of 5 to 100 percent by weight of acrylic acid and/or methacrylic acid, 0 to 95 percent by weight of an acrylic ester, the alcohol group having from 1 to 8 carbon atoms—in case up to 80 percent by weight of the acrylic ester may be replaced by styrene.

The neutralizing agent is ammonia. These kinds of polymers are known from German Pat. 743,945 and French Pat. 883,341.

For use as thickener the alkalized aqueous solution generally contains 10 percent by weight of the copolymer in the solution.

By Bentonites are meant swelling clays containing montmorillonite as the principal component and being capable to absorb water in a multiple of their weight. Preferably for producing a durable thixotropy magnesium montmorillonite or highly purified magnesium silicate is used. The interchangeable alkali ions may be replaced by an amine.

The inorganic fibrous materials include asbestos fibers having a maximum fiber length of 0.8 mm. and preferably more than 90 percent by weight of them have a maximum length of less than 0.5 mm. and a minimum length of more than 0.1 mm.

The organic fibrous materials include natural fibers such as cotton, wool, hair, silk fibers, synthetic fibers such as viscose fibers, cellulose acetate fibers, polyethylene fibers, polyvinyl chloride fibers, polyacrylonitrile fibers, polyester fibers, polyamide fibers, polyurethane fibers.

The organic fibers have a maximum fiber length of 3 mm., preferably the fiber length should not exceed 0.8 mm.

DESCRIPTION OF THE PREFERRED EMBODIMENTS

Since, as is known in the prior art, the conventional sealing compounds of a PVC-plastisol or organosol, as well as bitumen-containing sealing compounds exhibit a very high viscosity, the processing thereof is possible only by means of a high pressure pump. In contrast thereto, the coating composition of this invention exhibits a substantially more advantageous processability. In this connection, the high pressure pump can be omitted when applying the composition by means of a spray gun, and a ring conduit conventional in the lacquering art, or a customary pressure tank is sufficient.

Whereas the conventional PVC-sealing compounds tend to post-gel, the coating composition employed according to this invention exhibits a very high shelf stability, which represents an essential advance in the art. Besides, the sealing compounds used in accordance with the invention are free of plasticizers. Consequently, there is no possibility for the migration of plasticizer into the layer disposed therebeneath, as is normally encountered in the case of a gelled polyvinyl chloride layer. Furthermore, the coating composition employed according to the present invention need not be gelled under heat, as in the case of a PVC-layer. The present coating composition dries readily at room temperature. Thereby it is possible, for example, to coat structural components to be attached to car bodies with a protective coating in workshops, without having to treat these compounds at an elevated temperature.

A multiple coating containing bitumen in a layer is subject to bleeding. This disadvantage is not exhibited by the coating composition of the present invention. Furthermore, it has the great advantage that it is non-flammable.

It is a well known and troublesome phenomenon that, when spraying coating compositions by means of a spray gun, spray mists are produced which are distributed over a rather large area and can affect a subsequent lacquering. Spray mists containing PVC or bitumen are smeary and must be carefully washed off by means of organic solvents. Otherwise, film impairments are unavoidable when the processing is thereafter continued with normal lacquers. Surprisingly, the spraying of the coating composition employed according to this invention does not present any difficulties. Moist spray mists are produced which can readily and conveniently be washed off within the first few minutes, as long as the spray mist is still moist, by means of water. This is possible, in general, within up to 5 minutes after application of the coating composition. Thereafter, the spray mist becomes hard and can be abraded after 10 minutes of air drying, or, surprisingly, can be covered by spraying any desired lacquer thereover, without the film being impaired during the subsequent lacquering procedure.

Besides, the films obtained by the coating composition used in accordance with the invention exhibit a substantially smoother surface than the conventional PVC-film.

Another surprising effect is an essentially improved corrosion-protective action of the thus applied and dried coating layers, as compared to the conventional layers, at a substantially lower layer thickness, which is completely unexpected. When a non-bonderized iron sheet is coated, a corrosion protection is obtained in the salt spraying test according to the United States standard ASTM B 117–57 T up to 250 hours. In the Kesternich apparatus, according to German Industrial Standard DIN 50018, the corrosion protective effect remains intact even after six rounds in an $SO_2$-atmosphere. At the cutting edges, no penetration beneath the coating occurs, and the coating layer exhibits a good adhesion. When primed metal sheets are coated with the coating compositions utilized in accordance with the invention, they withstand, in the salt spraying test according to the ASTM standard, up to 500 hours. The layer thickness of the dried coating layer ranges between 200 and 2,000 microns. Normally, the layer thicknesses are in the lower range; only when sealing seams, a higher layer thickness of up to 2,000 microns becomes necessary. In this connection, it is surprising that a layer of 200 microns exhibits a better showing in the salt spraying test than a PVC-layer of 2,000 microns. Whereas a layer of 200 microns is sufficient in connection with the coating composition of this invention, a PVC-layer requires a minimum layer thickness of 600 microns.

Due to this unexpectedly high corrosion protective effect, the coating compositions employed according to the invention are particularly suitable for the application to the undercarriage of automobiles, trucks, and other vehicles, as an undercoating, since especially at that spot the material suffers the greatest exposure to salt, which is scattered on the roads in the wintertime in order to keep them free of ice. The coating compositions used according to the invention additionally provide the car bodies with good protection against the impact of rocks, due to the good adhesion and elasticity of the coating composition. The coating compositions can furthermore be employed in all those cases where a special corrosion protection is of importance, for example in connection with the external coats of containers and other large volume tanks. The coating composition employed according to the invention contains a synthetic rubber dispersion which is composed of copolymers containing, in addition to butadiene, also styrene, but likewise other monomers. Of advantage is the incorporation of an unsaturated carboxylic acid into the copolymer. The styrene proportion in the copolymer is between 35 and 85 percent by weight, preferably, however, between 39 and 60 percent. In order to obtain optimal properties for the thus produced coating, the proportion of the styrene-butadiene copolymer in the coating is to be 30 to 50 percent by weight of the dry weight of the coating.

Normally, there is no need for combining the styrene-butadiene copolymer rubber dispersion with other dispersions. In order to obtain specific film properties, for example, for purposes of additional plasticization or for slowing down the drying process, it is possible to substitute up to 45 percent of the styrene-butadiene copolymer by other dispersions or aqueous resin solutions. Suitable for dispersions on the basis of acrylate or acrylonitrile, dispersions or solutions of drying alkyd resins or epoxy resins. In general, such additives reduce the corrosion resistance of the coating on an untreated iron sheet; however, they can improve the film properties on primed articles in those cases where furnace hardening is required, as well as on phosphate layers in general.

Solvents promote the film forming process and can be added in minor amounts, up to 2 percent, based on the liquid coating composition. After the solvents have evaporated, a film remains which corresponds to the hardness of the polymer.

The coating composition utilized in accordance with this invention contains inorganic and/or organic fibrous substances, for example, asbestos, polyamide fibers, polyester fibers, polyacrylnitrile fibers, with a maximum fiber length of 3 mm. In the application of the coating compositions of the present invention from airless spraying devices, the fibrous materials should not exceed a maximum fiber length of 0.8 mm. When asbestos fibers are employed, it is preferred that more than 90 percent by weight of them have a maximum length of less than 0.5 mm. The addition of the fibrous substances prevents the formation of cracks in those cases wherein a dry film thickness of more than 700 microns up to 2,000 microns is produced. The inorganic fibrous materials are contained in the coating composition in an amount of from 0 to 30 percent, but preferably between 20 and 25 percent, and the organic fibrous substances are contained therein in a quantity of between 0 and 3 percent, but preferably between 0.2 and 2 percent, of the dry weight of the total coating composition.

The coating composition employed according to the invention furthermore contains organic and/or inorganic thickeners preventing the moist coating from running off vertical surfaces. Suitable are, for example, polymer dispersions on an acrylate-acrylic acid basis, bentonites, or similar substances. For the production of a durable thixotropic composition, magnesium montmorillonite is preferably employed. In the same manner, a highly purified magnesium silicate can also be used.

Suitable pigments are, for example, zinc sulfide, titanium dioxide, iron oxide, and others. Fillers which can be used are aluminum silicates, barite, chalk, graphite, asbestos flour, talc, silicon carbide, and mica; additionally, the customary driers, defoamers, and wetting agents can be contained in the coating composition.

The coating composition used in accordance with the invention can be produced in the machines conventional for the lacquer industry. Normally, a mixer or a dissolver is sufficient. Thus, for example, for a suitable coating composition, 40–52 parts by weight of styrene-butadiene rubber dispersion having a solids proportion of 50 percent is mixed with 0 to 15 parts by weight of asbestos fibers and 0.4–0.8 part by weight of magnesium montmorillonite. Then, such an amount of pigments and fillers is added that the total solids content of the coating composition is more than 50 percent; usually, this content is on the order of magnitude of 55–70 percent.

The coating composition is thixotropic. The application on the articles to be coated can be conducted in various ways. Customarily, the coating composition is sprayed on by means of a spray gun. In this connection, the operation is carried out with a paint pressure of 0.5 to 3.0 atmospheres gauge, an atomizing pressure of 3 to 5 atmospheres gauge, and a nozzle width of the spray gun of 1.4 to 6 mm. in diameter. The values are dependent on the thickness of the coating which is desired. Another application method utilizes the airless process. In this process, the operation is conducted at a paint pressure of 60–400 atmospheres gauge and with a nozzle width of between 280 and 800 microns. For layer thicknesses of up to 400 microns, the electrostatic method of application is likewise possible in suitable units with mechanical atomization.

The thus applied coating layer is dried in air at room temperature, under normal conditions. However, the layer can also be subjected, after the application, to an accelerated drying step for 10–15 minutes at not more than 110° C., and can then be fused for up to 60 minutes at between 130 and 140° C.

In the following examples, the properties of the coatings are compared to the properties of a PVC-coating and a bitumen coating. All parts indicated in the examples are parts by weight.

EXAMPLE 1

A coating composition is produced by means of a dissolver, this composition having the following components:

52.0 parts of a dispersion of a copolymer of 40 percent styrene, 57 percent butadiene and 3 percent acrylic acid, with a solids content of 48 percent and an average particle size of 0.2 micron, having a pH of 8.0–8.5;
7.0 parts of a pigment, particularly iron oxide, black;
21.0 parts of aluminum silicate;
2.0 parts of silicon carbide;
0.5 part of magnesium montmorillonite;
0.7 part of organic thickeners;
0.3 part of defoamer;
0.2 part of cobalt naphthenate solution with a cobalt content of 6 percent;
0.3 part of wetting agent;
1.5 parts of butyl glycol;
14.5 parts of water.

The thus obtained sealing compound is thixotropic and is sprayed onto an untreated well cleaned iron sheet by means of a spray gun having a spraying pressure of 3 atmospheres gauge and a nozzle width of 3 mm. The coating obtained in this manner is baked for 12 minutes at 110° C. and thereafter for 60 minutes at 135° C. The properties of the fused coating are compiled in the following table. If the coating is dried merely in the air at room temperature, equally satisfactory corrosion protection values result.

EXAMPLE 2

A coating material having the following composition is prepared in a dissolver:

39.0 parts of the copolymer dispersion described in Example 1;
16.0 parts of asbestos, at least 90 percent thereof having a fiber length of not more than 0.5 mm.;
1.0 part of titanium dioxide, rutile;
24.0 parts of aluminum silicate;
3.0 parts of silicon carbide;
0.4 part of maganese montmorillonite;
0.7 part of organic thickeners;
0.4 part of defoamer;
0.2 part of cobalt naphthenate solution with 6 percent of metallic cobalt;
0.4 part of wetting agent;
2.0 parts of butyl glycol;
12.0 parts of water.

This coating composition is likewise applied to a well cleaned, smooth steel sheet and hardened, as described in Example 1. The test results are compiled in the table set forth below.

EXAMPLE 3

The coating compound has the following composition:

28.0 parts of the copolymer dispersion described in Example 1;
5.0 parts of an acrylate-polymer dispersion having a solids content of 50 percent;
4.0 parts of an aqueous, commercially available alkyd resin solution with 60 percent solids content;
17.0 parts of asbestos, at least 90 percent thereof having a maximum fiber length of 0.5 mm.;
5.0 parts of zinc sulfide;
5.0 parts of iron oxide, red;
3.0 parts of talc;
13.0 parts of aluminum silicate;
0.6 part of magnesium montmorillonite;
0.4 part of defoamer;
0.15 part of cobalt naphthenate solution;
0.4 part of wetting agent;
15.0 parts of water.

This coating composition is likewise applied to a cleaned smooth steel sheet by means of a spray gun, and fused as set forth in Example 1. The results are compiled in the table.

EXAMPLE 4

The coating compound has the following composition:

40.0 parts of the copolymer dispersion described in Example 1;
20.0 parts of aluminum silicate;
7.0 parts of mica;
6.0 parts of asbestos flour;
1.0 part of polyamide fibers, 20 denier, maximum fiber length 3 mm.;
4.0 parts of graphite;
6.0 parts of lithopone;
0.8 part of magnesium montmorillonite;
0.7 part of an organic thickener;
0.4 part of defoamer;
12.0 parts of water;
1.7 parts of butyl glycol;
0.4 part of wetting agent.

This coating composition is applied to a cleaned, smooth steel sheet by means of a spray gun and fused as indicated in Example 1. The results are compiled in the table.

EXAMPLE 5

A sealing compound on the basis of a PVC-plastisol employed for comparison purposes has the following composition:

19.0 parts of polyvinyl chloride;
24.4 parts of plasticizer on the basis of alkylsulfonic acid esters of phenol and cresol;
2.0 parts of dioctyl phthalate;
8.0 parts of phenol-formaldehyde resin;
30.0 parts of chalk;
14.0 parts of aluminum silicate;
2.0 parts of iron oxide, red;
0.6 part of dimethyl dioctadecylammonium bentonite.

The sealing compound is applied to a smooth iron sheet by means of a spray gun having a 6 mm. nozzle, with the aid of a high pressure feed pump and fused for 20 minutes at 130° C. The properties of the coating are contained in the table.

EXAMPLE 6

A sealing compound on a bitumen rubber base, utilized for comparison purposes, has the following composition:

16.0 parts of rubber;
1.5 parts of root resin;
9.0 parts of chalk;
5.5 parts of barite;
12.5 parts of aluminum silicate;
4.0 parts of carbon black;
2.5 parts of colophony;
6.0 parts of bitumen;
5.0 parts of toluene;
2.0 parts of methyl ethyl ketone;
34.0 parts of mineral spirit;
2.0 parts of methanol The sealing composition is applied to a smooth, well cleaned steel sheet by means of a spray gun having a nozzle width of 6 mm. with the aid of a high pressure feed pump. The coating has dried after 24 hours in air at room temperature. The properties of the coating are contained in the table.

TABLE

| | Example | | | | | |
|---|---|---|---|---|---|---|
| | 1 | 2 | 3 | 4 | 5 | 6 |
| Properties of the liquid coating compositions: | | | | | | |
| Flash point (according to Abel-Penski) | None | None | None | None | None | Below +21° C. |
| Shelf ability | Good | Good | Good | Good | Limited | Good. |
| Contains plasticizer | No | No | No | No | Yes | No. |
| Sprayable without a high pressure feed pump | Yes | Yes | Yes | Yes | No | No. |
| Air drying possible | Yes | Yes | Yes | Yes | No | Yes. |
| Properties of the dried coatings: | | | | | | |
| Minimum layer thickness to obtain a closed film (micron) | 200 | 200 | 200 | 200 | 600–900 | 500–1,000. |
| Maximum thickness of dry film (micron) | 700 | 2,000 | 2,000 | 2,000 | 3,000 | 2,000. |
| Spray mist compatibility with subsequent lacquer layers | Good | Good | Good | Good | Bad | Bad. |
| Bleeding when sprayed over | No | No | No | No | No | Yes. |
| Resistance to oil and gasoline | Good | Good | Good | Good | Good | Bad. |
| Corrosion resistance against salt mist according to ASTM B 117-57 T: | | | | | | |
| 250 hours on a smooth metal sheet, with a thickness of the dry coating of 25 microns. | do | do | Satisfactory | Satisfactory | Unsatisfactory | Bad. |
| 500 hours on primed metal sheets: | | | | | | |
| With a thickness of the dry coating of 250 microns | do | do | Good | Good | do | Satisfactory. |
| With a thickness of the dry coating of 700 microns | do | do | do | do | Strong penetrations beneath coating at cutting edges. | Good. |
| With a thickness of the dry coating of 2,000 microns | do | do | do | do | do | Do. |

What is claimed is:

1. Weatherproof caulked external metal surfaces consisting of an iron containing base material having thereon a hardened coating firmly bonded to the metal, said coating containing a binder consisting of a copolymer formed by copolymerization of 35–85 percent by weight styrene, 10–64 percent by weight butadiene and 1–5 percent by weight of an organic unsaturated carboxylic acid, filler material, thickeners and fibrous substances, said coating having a layer thickness of between about 200 and 2000 microns wherein said coating consists essentially of in a ratio, relating to the liquid coating material, of:

30–50 percent by weight of said copolymer formed by copolymerization of 35–85 percent styrene, 10–64 percent butadiene, 1–5 percent acrylic acid;

40–60 percent by weight of said filler material selected from the group consisting of metal oxides, metal sulfides, metal silicates, barite, chalk, silicon carbide, mica, talc and asbestos flour;

1–5 percent by weight of said thickeners selected from the group consisting of polymeric material based on an acrylate-acrylic acid copolymer, bentonites and magnesium silicate; and said fibrous substances selected from the group consisting of up to 30 percent by weight of inorganic fibers and up to 3 percent by weight of synthetic organic fibers.

2. The caulked external metal surface of claim 1 having a primer between said base material and said coating.

3. The caulked external metal surface of claim 1, wherein said styrene is 39–60 percent, said butadiene is 40–61 percent and said acrylic acid is 2–3 percent.

4. The caulked external metal surface of claim 1, wherein said inorganic fibers are 20 to 25 percent by weight and said synthetic organic fibers are 0.2 to 2 percent by weight.

5. The caulked external metal surface of claim 1, wherein said coating further contains pigments.

References Cited

UNITED STATES PATENTS

| | | | |
|---|---|---|---|
| 3,131,158 | 4/1964 | Kemp et al. | 260—45.85 TX |
| 3,561,996 | 2/1971 | Young | 117—75 X |
| 2,952,565 | 9/1960 | Contois et al. | 117—132 CBX |

OTHER REFERENCES

Damusis, A. Sealants, Reinhold Publ. Corp., New York, N.Y., pp. 7, 8, 63, 144, 1967.

Noble, R. J., Latex in Industry, second edition, Rubber Age, New York, N.Y., 1953, pp. 236–239.

RALPH HUSACK, Primary Examiner

U.S. Cl. X.R.

117—94, 104 R, 132 CB, 161 UT, 161 UD